H. MARANVILLE.
Fire-Shovel and Tongs.

No. 156,096.                                      Patented Oct. 20, 1874.

UNITED STATES PATENT OFFICE.

HARVEY MARANVILLE, OF AKRON, OHIO.

IMPROVEMENT IN FIRE SHOVELS AND TONGS.

Specification forming part of Letters Patent No. 156,096, dated October 20, 1874; application filed July 18, 1874.

*To all whom it may concern:*

Figure 1:
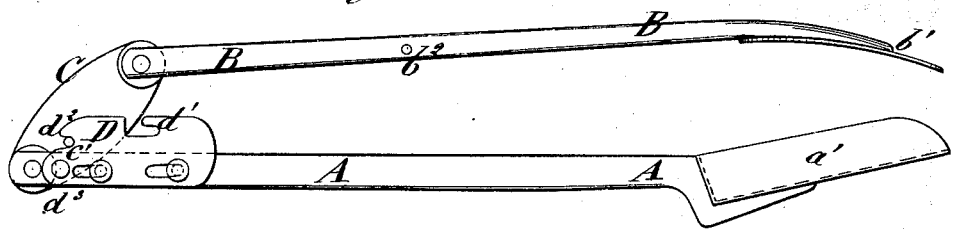
Figure 2:
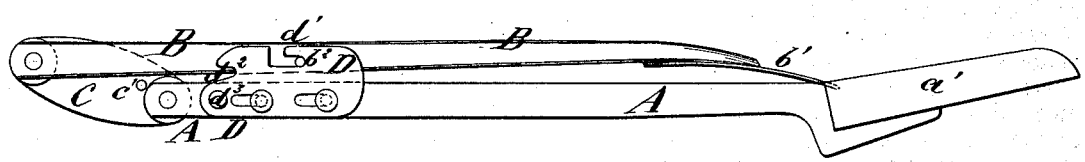
Figure 3:
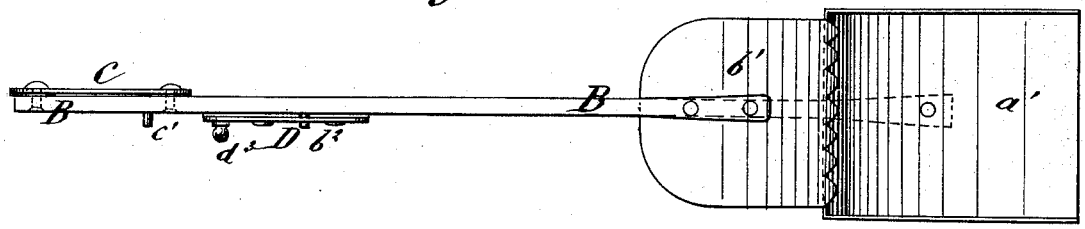

Be it known that I, HARVEY MARANVILLE, of Akron, in the county of Summit and State of Ohio, have invented a new and useful Improvement in Combined Shovel and Tongs, of which the following is a specification:

Figure 1 is a side view of my improved device adjusted as a tongs. Fig. 2 is a side view of the same adjusted as a shovel. Fig. 3 is a top view of the same adjusted as a shovel.

Similar letters of reference indicate corresponding parts.

My invention has for its object to furnish an improved implement that may be readily adjusted for use as a shovel or tongs, and which shall be simple in construction and conveniently adjusted for use in either capacity.

The invention will first be fully described, and then pointed out in the claim.

A and B are two arms or bars, to the forward end of one, A, of which is attached a shovel-plate, $a'$, which also serves as a jaw for the tongs. To the forward end of the other arm, B, is attached a plate, $b^1$, which serves as the other jaw of the tongs. The rear ends of the arms A B are pivoted to the opposite ends of a short plate, C, which thus hinges them together. Upon the side of the rear end of the arm A is placed a small plate, D, which is secured in place by screws or rivets which pass through short slots in the said plate D, so that the said plate may have a short longitudinal movement upon the arm A. A small spring may be interposed between the plate D and the arm A to hold the said plate in either position. The upper edge of the plate D projects above the arm A to overlap the arm B or plate C, according as the implement is adjusted as a shovel, as shown in Fig. 2, or as a tongs, as shown in Fig. 1. In the middle part of the upper edge of the plate D is formed an L-notch, $d^1$, to receive a pin, $b^2$, attached to the arm B, and lock the arms A B together when the arm B is drawn back to adjust the implement as a shovel. In the rear end of the upper edge of the plate D is formed a notch, $d^2$, to receive a pin, $c'$, attached to the plate C to lock the said plate C in place when serving as a hinge to the tongs. The plate D is moved to secure and release the pins $b^2$ $c'$ by means of a small knob, $d^3$, attached to its rear end.

The arms A B may be made of any desired or convenient length, according to the use for which the implement is intended.

Having thus described my invention, I claim as new and desire to secure by Letters Patent—

The slotted plate D, having L-shaped notch $d^1$ and notch $d^2$, in combination with arms A B, provided with side studs, pins, or rivets, and conjoined by a plate, C, having a side pin, as and for the purpose specified.

H. MARANVILLE.

Witnesses:
 E. W. STUART,
 C. P. HUMPHREY.